(12) United States Patent
Goyhenetche et al.

(10) Patent No.: US 6,369,552 B2
(45) Date of Patent: Apr. 9, 2002

(54) REGULATED AUXILIARY POWER SUPPLY

(75) Inventors: Phillippe Goyhenetche, Toulouse; Francois Lhermite, Lasserre; Dominique Omet, Cugnaux; Pascal M. Otero, Bonrepos/Aussonnelle, all of (FR)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/781,705

(22) Filed: Feb. 12, 2001

(30) Foreign Application Priority Data

Feb. 11, 2000 (EP) .............................................. 00400409

(51) Int. Cl.[7] ............................................... G05F 1/40
(52) U.S. Cl. ..................................................... 323/266
(58) Field of Search ................................. 323/265, 266, 323/268, 270, 271, 273, 282; 363/16, 17, 59, 60, 97, 98, 131, 132; 327/535, 536

(56) References Cited

U.S. PATENT DOCUMENTS 5,757,170 A * 5/1998 Pinney ........................ 323/266
5,936,852 A 8/1999 Weinmeier et al. ........... 363/21
5,941,990 A * 8/1999 Hiiragizawa ................. 713/310
5,982,642 A 11/1999 Herfurth ....................... 363/21
6,232,830 B1 * 5/2001 Fournel ....................... 327/540

FOREIGN PATENT DOCUMENTS

| DE | 19620034 A1 | 11/1997 | ............ H02M/3/04 |
| EP | 0859453 A2 | 8/1998 | ............ H02M/1/12 |
| EP | 0875983 A2 | 11/1998 | .......... H02M/3/335 |

* cited by examiner

Primary Examiner—Matthew Nguyen

(57) ABSTRACT

A charge pump apparatus and a method for operating a charge pump power supply having an input and an output, the output coupled to a load, and the load having a bulk capacitor coupled thereto for providing a voltage source for the load. A source of varying voltage is provided as an input to the charge pump power supply. The output of the charge pump power supply is coupled to the load and to the bulk capacitor, and the charge pump power supply is operated in a first mode to provide current for charging the bulk capacitor when the voltage at the load is below a predetermined voltage, and alternatively in a second mode to cease the supply of current to the bulk capacitor when the voltage at the power supply is above a predetermined voltage. The charge pump comprises a capacitor-diode arrangement with a transistor switch operable to control the current flow through the charge pump and to the bulk capacitor.

15 Claims, 4 Drawing Sheets

REGULATED AUXILIARY POWER SUPPLY

FIELD OF THE INVENTION

This invention relates to charge pump power supplies for use in providing power to circuits or systems, and more particularly to regulated charge pump power supplies.

BACKGROUND OF THE INVENTION

Efficient power supplies are necessary for providing power to many types of electronic circuits. Switched mode power supplies (SMPS), for example, are used in many applications in consumer and other products including television receivers, personal computers, facsimile machines, video cassette recorders, and computer monitors. These SMPS may be based on flyback transformer technology, but other technologies may be used as well.

Because of the heavy use of these power supplies in high volume consumer applications, standby power consumption is of great importance, since the devices are kept in standby mode most of the time. Additionally, industry standards recommend the permissible standby power consumption levels of such apparatus. Furthermore, again because of the high volume applications for these power supplies, low cost is also a significant factor.

In the past, when SMPS were only operated in a power on mode or turned off, the SMPS controller, which may be a separate integrated circuit, was usually powered from a secondary winding of the output transformer of the SMPS. Later apparatus such as television receivers, computer monitors, and the like required a power supply which could be operated in a standby mode, usually controlled by a microcontroller which was used to sense, for example, an infrared signal from a remote device to turn on the main power supply by providing an enable signal to the SMPS controller.

To achieve the low power consumption required in standby mode, a secondary reconfiguration technique is often used. Instead of disconnecting the loads from the power supply, which would be a very expensive solution because of the cost of the switches and other components needed to perform such an operation, all the secondary windings voltages must be drastically reduced. To do so, the voltage on one of the secondary windings of the power transformer must be pulled down to a level such that the microcontroller can be appropriately supplied. Since the voltage per turn of the output transformer is constant, however, the other output voltages are similarly reduced according to the same ratio. If the SMPS controller were also powered from the output transformer in standby mode as well as in power on mode, the winding voltage reduction in the transformer results in the SMPS controller no longer being properly supplied. To take advantage of the relatively inexpensive reconfiguration technique for standby operation, a cost effective way to supply the SMPS controller must be found.

Presently the problem of supplying power to the microcontroller is solved by the use of a separate, stand alone, low power flyback SMPS dedicated to supplying operating voltage to the microcontroller. While this solution does not require the use of the cost effective reconfiguration technique because if the microcontroller is separately powered the entire power supply, including the SMPS controller, may be turned off awaiting a signal from the microcontroller to resume supplying power, it itself is a somewhat expensive solution because of the cost of the additional components used as well as the area taken up by the additional circuitry on the SMPS circuit board. Accordingly, it is an object of this invention to provide a low cost method and circuit for providing power to an electronic device including, for example, an SMPS controller during standby operation, by providing a charge pump apparatus and a method for operating a charge pump power supply so as to provide regulated power to the electronic device.

DESCRIPTION OF THE PREFERRED EMBODIMENT

Figure 1:
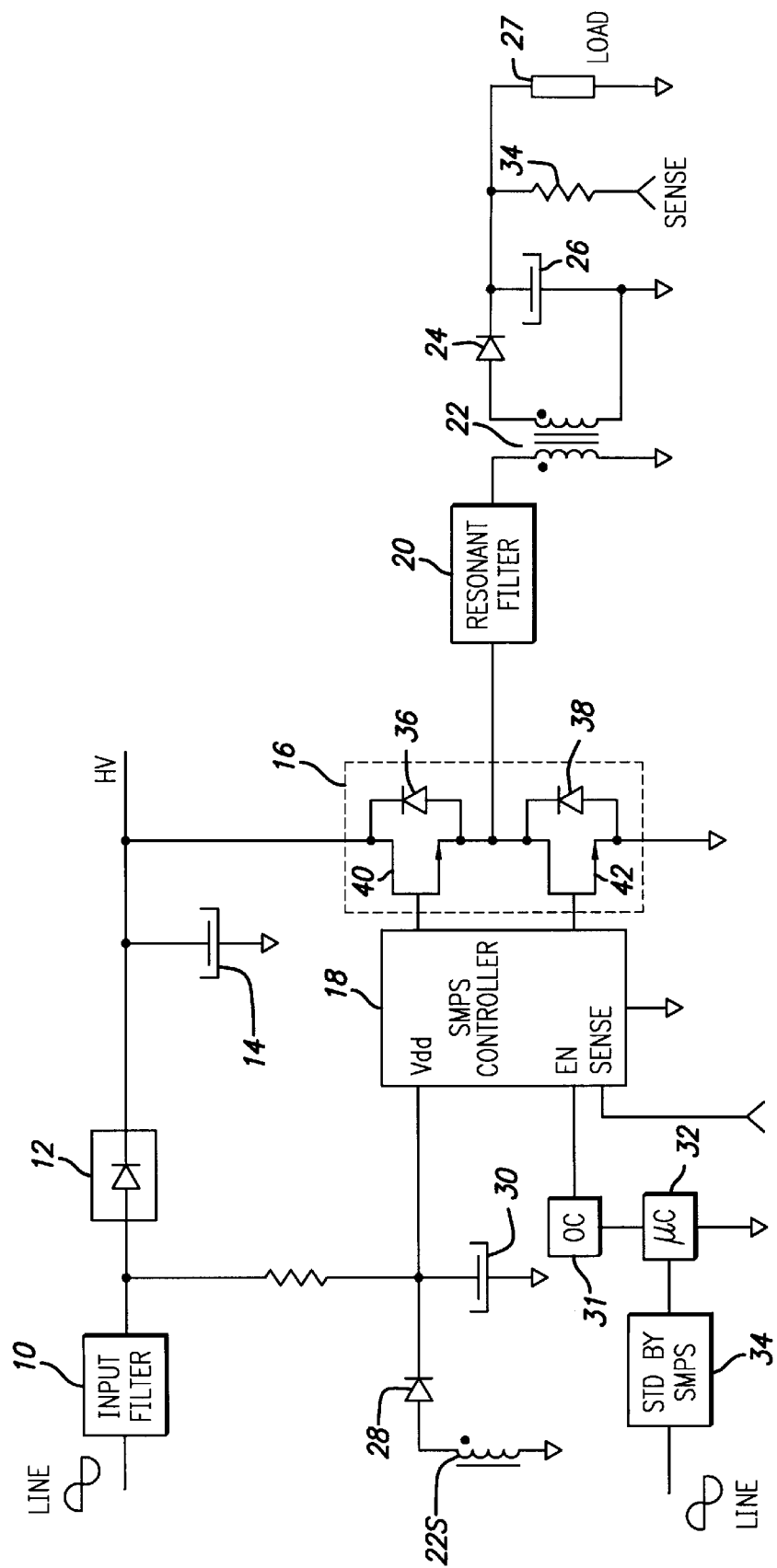
FIG. 1 shows a schematic diagram of a switched mode power supply where the microcontroller power supply is a dedicated low power SMPS.

As an example of a use of the regulated charge pump power supply of the instant invention, a preferred embodiment of the charge pump will be shown as it may be used to address a power supply problem relating to switched mode power supplies. FIG. 1 shows a schematic diagram of a switched mode power supply (SMPS) of the half bridge type where the microcontroller power supply is a dedicated low power SMPS. The input voltage from the power mains is applied to an input filter 10, which is an RF filter designed to eliminate electromagnetic interference in accordance with the design standards for many, particularly consumer, products and in accordance with good engineering practice. The output of filter 10 is applied to a conventional bridge rectifier 12 consisting of four diodes in a bridge configuration. A filter capacitor 14 filters the output of the bridge rectifier 12 and the voltage on capacitor 14 is the rectified mains voltage of approximately 120 to 400 volts (depending upon the original mains voltage) which operates a half bridge structure 16 which is used, in conjunction with an SMPS controller 18, to regulate the output voltage of the power supply. The SMPS controller 18 in this preferred embodiment may be any of several conventional SMPS controllers designed for use with half bridge structures.

At the mid point of the half bridge structure 16 is produced a square wave which is filtered by a resonant filter 20 to produce a quasi-sine wave. The output of the resonant filter 20 is the input to the primary winding of a power transformer 22, the secondary winding of which is coupled through a diode 24 and a capacitor 26 to an output load 27. The secondary winding of transformer 22 is provided with a ratio of turns with respect to the primary to produce the desired load voltage for the particular apparatus for which the SMPS is to be used.

In power on mode the voltage to power the SMPS controller 18 is provided by another secondary winding 22s of power transformer 22. The voltage from the secondary winding is rectified and filtered by the diode 28 and bulk capacitor 30 and applied to the Vdd input pin of the SMPS controller 18. A microcontroller 32 provides an enable signal (EN) to the controller 18 via an optical coupler 33 when it in turn receives a signal from, for example, an infrared remote device operated by the user of the apparatus that may be a television set or VCR. The optical coupler 33 is used to provide isolation between the power circuitry associated with the microcontroller 32 and the power supply controller 18.

Power to the microcontroller is supplied by a separate, dedicated switched mode power supply 34 that, in turn, is supplied from the power mains. The use of a separate power supply for the microcontroller 32 allows the controller 18, via the enable input EN, to switch to a disable mode where it draws minimum power when the power supply is in standby mode.

As previously mentioned, however, the provision of a separate SMPS power supply for the microcontroller 32 solves one problem of powering different portions of the SMPS power supply, but it is not itself a particularly cost effective overall solution.

In operation in power on mode, the bridge rectifier 12 full wave rectifies the filtered mains voltage to produce the operating voltage for the half bridge 16. The half bridge 16 is comprised of two diodes 36 and 38, which respectively have connected across them two switches 40 and 42, which may be MOS transistors. The square wave output at the midpoint of the half bridge is filtered to create a quasi-sine wave by resonant filter 20. The output of resonant filter 20 is applied to transformer 22 that transforms the input voltage to the desired load voltage that is subsequently applied to the load 27.

Coupled to the load 27 through an appropriate resistor 34 is a feedback sense circuit that produces a sense signal applied as a Sense input to the SMPS controller 18. The sense signal usually is provided by an optical coupling circuit to provide isolation between the output circuit and the controller 18. The Sense input of the controller 18 operates an oscillator within the controller (not shown) that, in conjunction with an external (to the controller) resistor-capacitor circuit (not shown), controls the frequency of operation of the switches 40 and 42 of the half bridge thereby regulating the voltage at the load.

The circuit of FIG. 1, however, still suffers from the problem of operation in the reconfiguration mode since although the microcontroller 32 now has a stable power supply when the SMPS is off, is it desirable to reduce the overall cost of the SMPS power supply.

Figure 2:
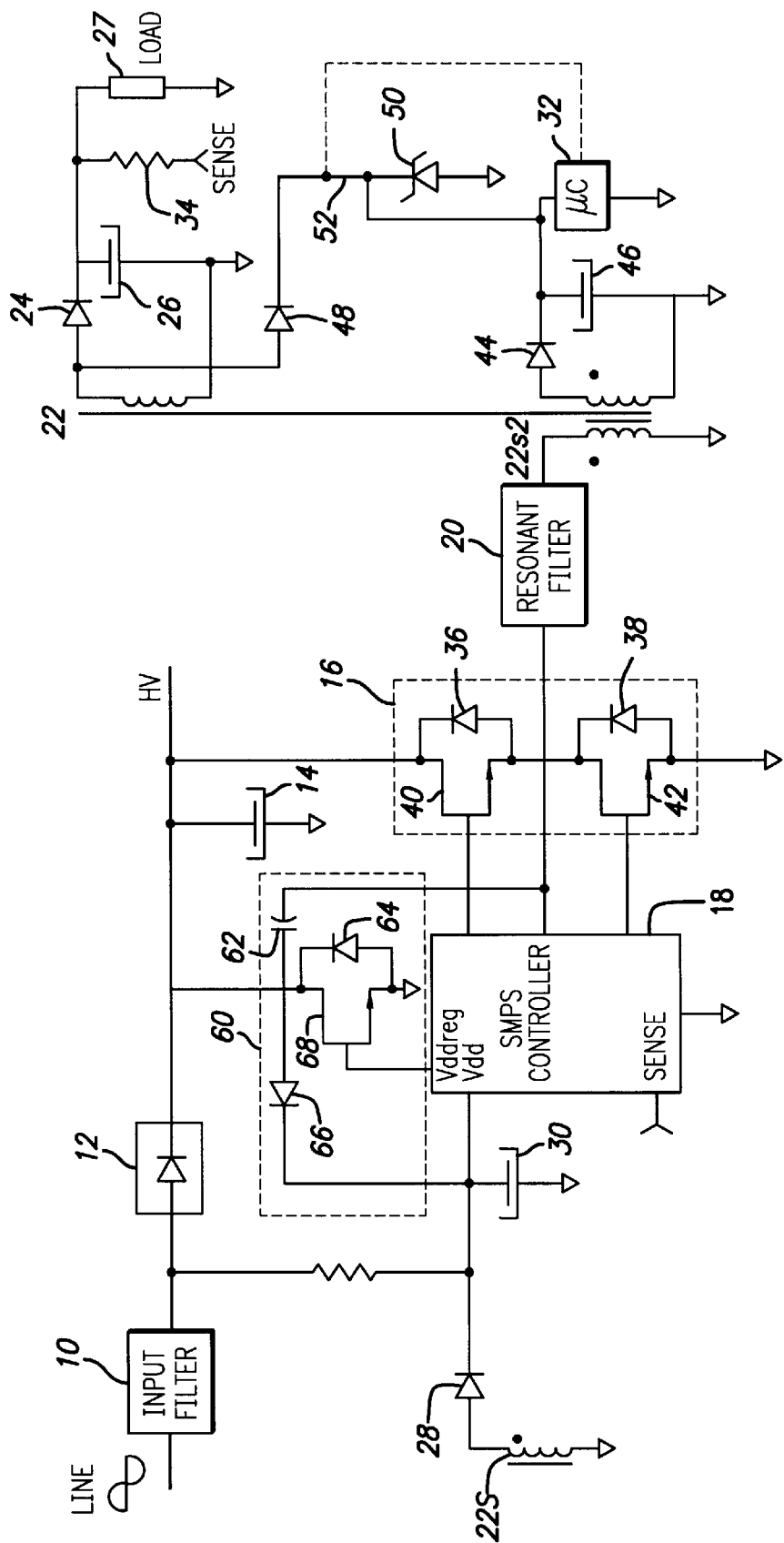
FIG. 2 shows a schematic diagram of a switched mode power supply according to the instant invention.

FIG. 2 shows a schematic diagram of a switched mode power supply according to the instant invention. Similar components of the circuit of FIG. 2 are numbered the same as their counterparts in FIG. 1. The overall structure and operation of the SMPS of FIG. 2 is similar to that of FIG. 1, the main difference being in the power sources for the microcontroller 32 and for the SMPS controller 18. As noted previously, if an auxiliary power supply for the SMPS controller can be provided, the microcontroller 32 can be powered from a secondary winding of the power transformer 22 while the SMPS is operating in its on mode. Also, in standby mode the microcontroller is powered at a consistent voltage by means of a connection to a suitable power supply as will be discussed later.

Accordingly, in this preferred embodiment of the invention, another secondary winding 22s2 for power transformer 22 is provided. The output from this winding is provided through diode 44 and filtered by capacitor 46 to the power input terminal of the microcontroller 32. Also shown in FIG. 2 is the switching arrangement for reconfiguring the circuit upon entering standby mode. From the secondary winding of transformer 22 is added an additional diode 48 and a zener diode 50. A switch 52, which may be an MOS transistor, is coupled between diode 48 and zener diode 50. The switch 52 is controlled by the microcontroller 32. The operation of this segment of the circuitry is as follows. When switch 52 is open diode 48 and zener diode 50 are not actively connected in the circuit and the microcontroller 32 is powered from the secondary winding 22s2. Upon the power supply entering standby mode, however, switch 52 is closed and the high voltage output of the main secondary of transformer 22 is pulled down to the breakdown voltage of the zener diode 50. This can be done because the microcontroller has its operating voltage applied through a coupling between the cathode of the zener diode 50 and the cathode of diode 44 supplying the microcontroller 32. By circuitry nor shown, as it forms no part of the instant invention, the voltage powering the microcontroller 32 is reduced upon the system entering reconfiguration mode to a nominal five volts. While the zener diode arrangement is shown here in a preferred embodiment, other ways to provide this result are possible.

This use of the reconfiguration technique and the independent powering of the microcontroller 32 are made possible because the SMPS controller is now separately supplied in a cost effective and reliable manner. The supply for the SMPS controller 18 is a charge pump circuit 60 that takes advantage of the square wave at the mid point of the half bridge structure 16.

A charge pump usually is not a viable power supply for a SMPS because SMPSs have to accommodate a wide variation of mains voltages. The magnitude of the square wave applied to such a charge pump varies in accordance with the mains voltage. Also, the current generated by the charge pump is directly proportional to the mains voltage as follows:

$$I = C\ dv/dt$$

The energy transferred from the charge pump capacitor to the Vdd Elcap is:

$$E = \tfrac{1}{2} C V_{mains}^2$$

The line voltage of the mains may be from 80V to 280V so the transferred energy varies according to a ratio of 10:1. Additionally, the transferred energy is directly proportional to the operating frequency.

The input voltage of the SMPS controller 18 must be limited to about 15 volts for proper operation, so the excess energy coming from the charge pump if operating in an environment where the square wave output of the half bridge is high, must be dissipated by circuitry within the controller 18 or externally to the controller, for example a zener diode. If an external zener diode were used, it may possibly be provided across capacitor 30. Dissipating the excess power internally of the controller 18 is not a viable solution because of energy dissipation problems relating to packaging considerations. Dissipating the excess power externally is not a desirable solution either, because of the general need to reduce energy waste in consumer circuits and the cost associated with providing an additional device, the zener diode. Thus, a conventional charge pump circuit cannot be used.

In the circuit of FIG. 2, in normal operation, the power to the controller 18 is provided by the secondary winding of the power transformer 22. The current through the winding charges the capacitor 30 that is coupled to the Vdd power supply pin of controller 18. When the SMPS reverts to standby mode, the reconfiguration switch 52 is closed and the current through secondary winding 22s collapses. Power to the controller 18 is then provided by the charging of capacitor 30 by charge pump 60.

The charge pump of the instant invention comprises a capacitor 62 and a pair of diodes 64 and 66. In a preferred embodiment capacitor 62 is coupled to the midpoint of the half bridge 16 from which it receives a square wave signal. The capacitor is also coupled to diodes 64 and 66. The output of diode 66 is coupled to the Vdd input terminal of SMPS controller 18. Across diode 64 is a switch, which may be a MOSFET 68 that is gated by a signal Vddreg from the SMPS controller. Depending on the configuration of diodes and switch forming a part of the charge pump 60, the body of the MOSFET may be used as a diode in place of its associated diode.

In the operation of the charge pump, the Vdd voltage is monitored by the controller 18. As the Vdd voltage exceeds a given threshold, for example thirteen volts, the Vddreg control signal from the controller 18 is also set to about thirteen volts to turn the MOSFET switch 68 on. MOSFET 68 shorts diode 64 making the charge pump mechanism inefficient. Due to the power consumption of the controller 18, the Vdd voltage of the controller decreases as capacitor 30 discharges and reaches a second threshold of perhaps 12 volts, at which time Vddreg is reset to zero volts and MOSFET switch 68 is opened and the free operation of the charge pump to recharge capacitor 30 is resumed. In the operation of the charge pump of the instant invention, then, excess energy need not be dissipated within the controller, and less energy waste is incurred.

Figure 3:
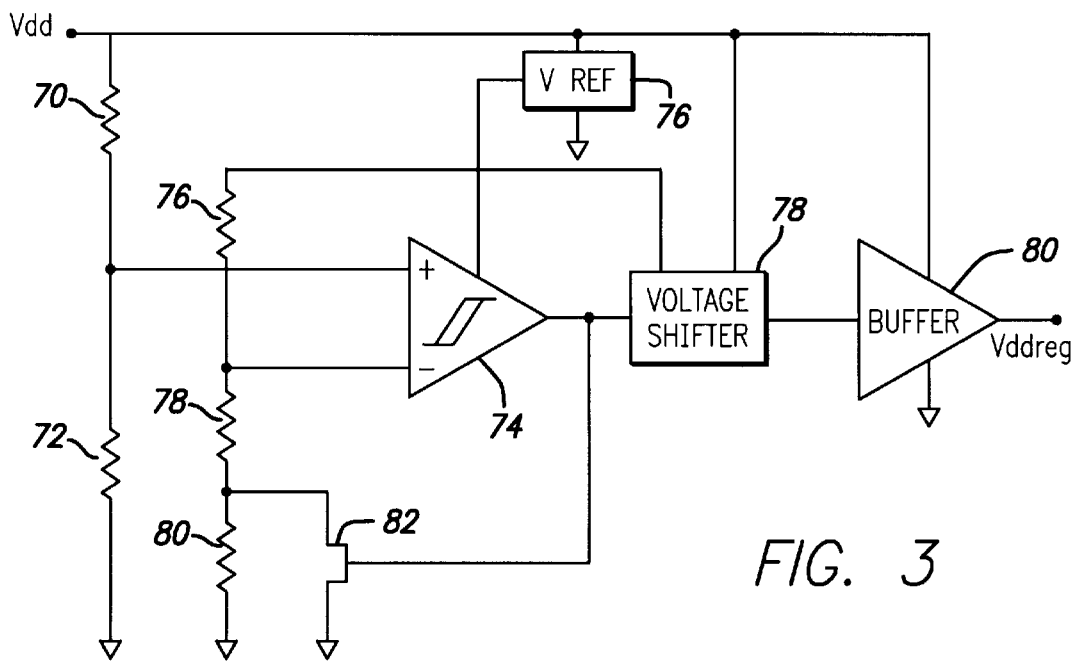
FIG. 3 is a schematic diagram of the circuitry used to generate the signal Vddreg.
Figure 4:
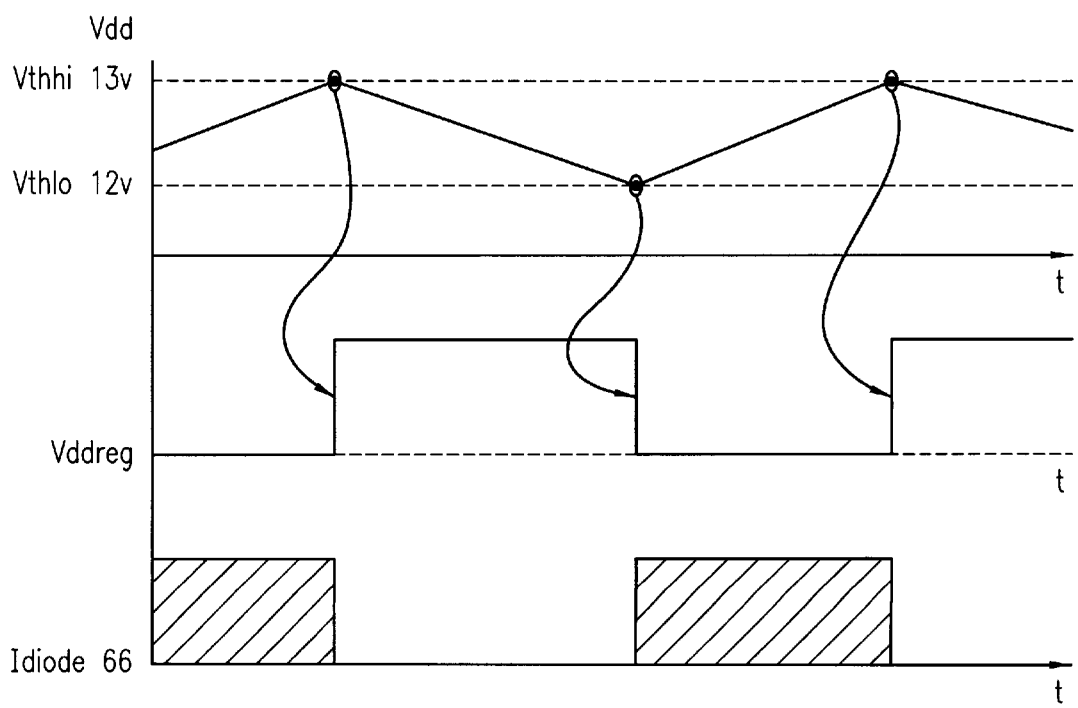
FIG. 4 is a timing diagram describing the operation of the circuit of FIG. 3.

The signal Vddreg is provided by circuitry internal to the controller 18 as shown in FIG. 3, which can be better understood in conjunction with the timing diagram of FIG. 4.

The power input pin Vdd of controller 18, which receives the output of the charge pump 60 is connected internally of the controller 60 by means of a resistor bridge 70, 72 to a hysteretic comparator 74. The two thresholds of the comparator 74 are adjusted by means of the resistor bridge formed by resistors 76, 78, 80, in conjunction with transistor 82. The ability of transistor 82 to short resistor 80 provides a voltage at the comparator input of either of two voltages sufficient to turn the comparator 74 on or off when Vdd reaches (in this example) twelve or thirteen volts, respectively. For other applications, of course, different thresholds could be selected by varying the values for resistors 76, 78, and 80. A voltage source 76 provides power to the comparator 74. The voltage source 76 may be a band gap reference or other convenient source. The output of comparator 74 is applied to a voltage shifter 78 that adapts the output of the comparator 74 to the Vdd supply rail. A buffer 80 provides the correct current level to drive the external switch 68 used in conjunction with the charge pump 60.

In operation, when Vdd is rising from twelve volts to thirteen volts (meaning that the external capacitance 30 of FIG. 2 needs to be recharged) the Vddreg output is low, the switch 68 is off, and the charge pump 60 is activated allowing current flow through diode 66 to charge capacitor 30 as shown in FIG. 4. When Vdd reaches thirteen volts, the output of comparator 74 goes high causing Vddreg to go high thus turning on switch 68 destroying the charge pump efficiency and reducing or completely stopping the flow of current (depending on the diode/switch configuration) through diode 66 as is also seen in FIG. 4. During this time the capacitor 30 is allowed to discharge because of the current consumption of the controller 18 and overall switching activity. When Vdd reaches twelve volts the output of comparator 74 goes low causing Vddreg to go low, as in FIG. 4, thus turning off transistor 68, restoring the action of the charge pump, and the cycle repeats.

Figure 5:
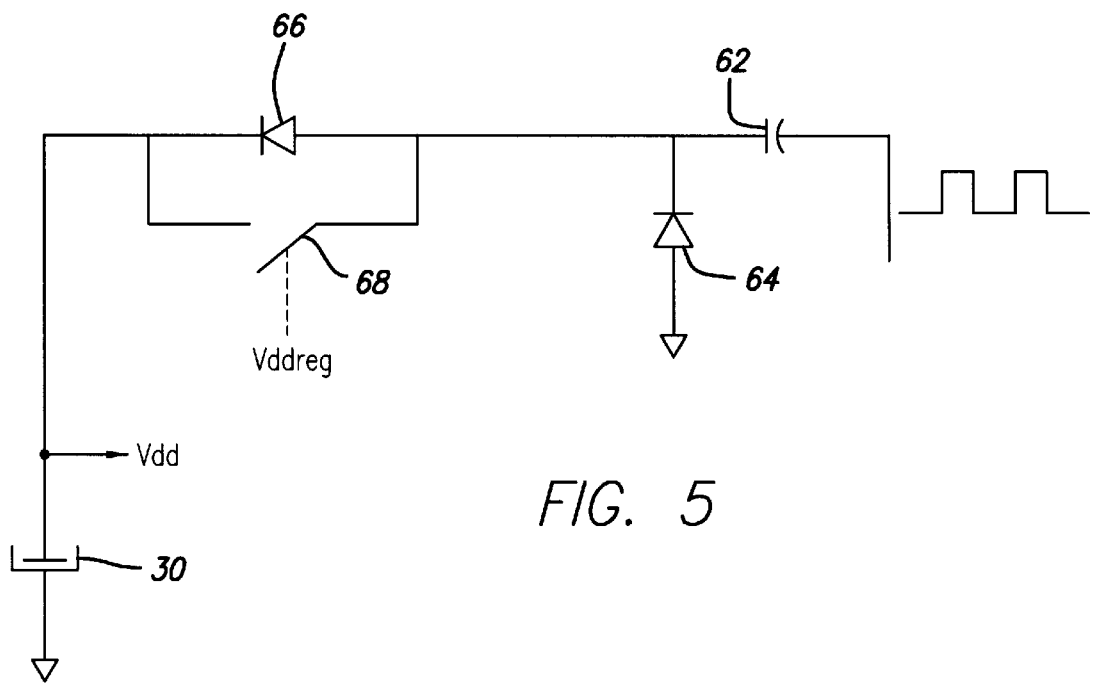
FIG. 5 shows an alternative arrangement of the components of the charge pump power supply according to the invention.

The preferred embodiment of the invention as shown in FIG. 2 shows only one of several possible arrangements of the diodes, capacitor and MOSFET switch which are possible. FIG. 5 shows an alternative arrangement of the capacitor, diode and switch components of the charge pump power supply in which the switch 68 that is controlled by Vddreg is across diode 66.

Figure 6:
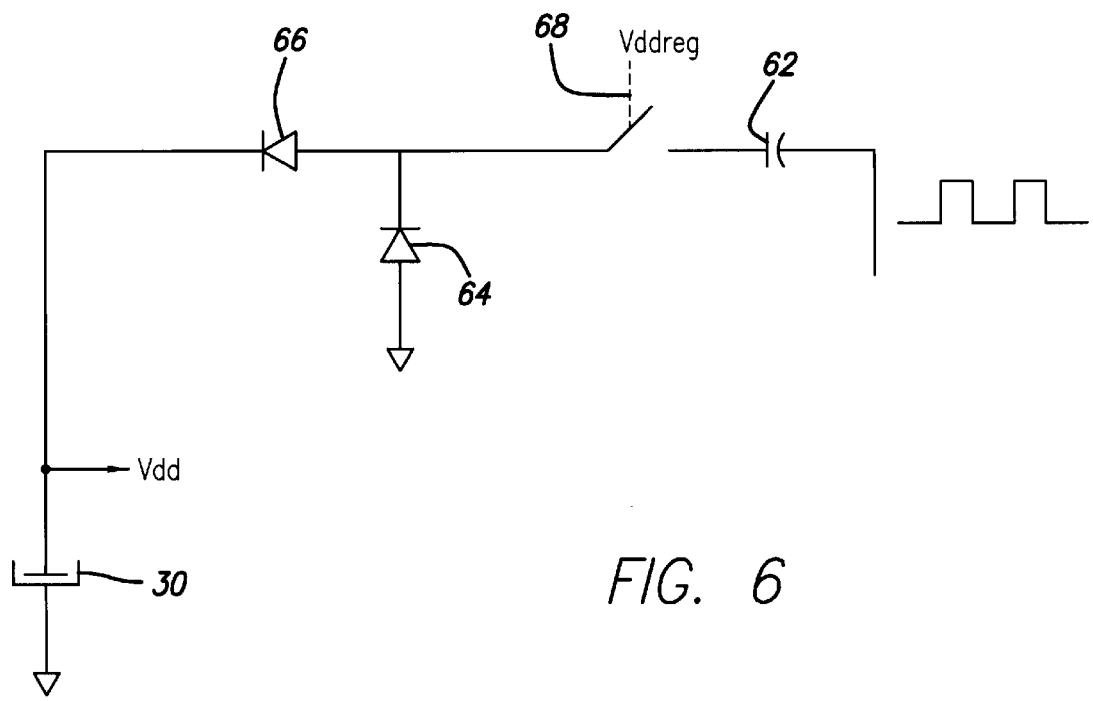
FIG. 6 shows another alternative arrangement of the components of the charge pump power supply according to the invention.

FIG. 6 likewise shows an alternative arrangement of the capacitor, diode and switch components of the charge pump power supply in which the switch 68 is in series with capacitor 62. When open, switch 68 stops all flow of current through capacitor 62. While FIG. 6 shows the switch on the charge pump side of capacitor 62, it could as well be on the half bridge side. In the case of the arrangements of FIG. 2 and FIG. 5, the switch is closed to short diode 64 or diode 66, respectively, which stops all current flow through capacitor 62 and stops all charge pump action.

In any of the alternative diode/switch arrangements of FIG. 2, FIG. 5 or FIG. 6 it should be noted that the body of the MOSFET 68 itself could serve as one of the diodes, thus eliminating the need for one of the components.

Although the regulated charge pump power supply has been described in a configuration relating to the solution to a power supply problem in switched mode power supplies, the invention has many other uses where a low cost regulated supply voltage is needed and a supply of varying voltage is available.

What is claimed is:

1. In a circuit having a primary source of power, the circuit containing a portion thereof which requires a regulated power source independent of the primary source of power, and having an available source of varying voltage, a charge pump power supply for providing the regulated power source, comprising:

a capacitor coupled to the source of varying voltage, a first diode coupled to the capacitor and to a load to allow current to flow through the first diode, a second diode having its cathode connected to the junction between the first diode and the capacitor, and a switch coupled to the charge pump power supply for selectively limiting the current through the capacitor to regulate the voltage of the power supply to the load.

2. A charge pump power supply as set forth in claim 1 further comprising a second capacitor, the second capacitor coupled to the load, the charge thereon providing power to the load.

3. A charge pump power supply as set forth in claim 2 wherein the switch is connected across one of the first and second diodes to short the diode when the switch is closed, thereby limiting the current flowing through the first capacitor.

4. A charge pump power supply as set forth in claim 2 wherein the switch is coupled in series between the source of varying voltage and the first capacitor thereby limiting the flow of current through the first capacitor.

5. A charge pump power supply as set forth in claim 3 wherein the switch is a transistor.

6. A charge pump power supply as set forth in claim 5 wherein the first or second diode is formed from the body of the transistor.

7. A circuit as set forth in claim 1 wherein the circuit is a switched mode power supply and the source of varying voltage is a half bridge structure forming part of the switched mode power supply.

8. A circuit as set forth in claim 7 wherein the circuit requiring the regulated source of power is the switched mode power supply controller.

9. In a switched mode power supply having an integrated circuit controller to provide voltage regulation, and having a source of varying voltage, the switched mode power supply being operable in a normal mode and in a standby mode in which the output voltage is substantially reduced, a circuit for powering the controller during standby mode comprising:

a charge pump circuit having an input and an output, the input coupled to the source of varying voltage for receiving power therefrom, the output coupled to the input power supply terminal of the integrated circuit controller, and a switch coupled to the charge pump for controlling the voltage output of the charge pump when the switched mode power supply is in standby mode.

10. A switched mode power supply as set forth in claim 9 wherein the charge pump has a capacitor coupled from the input of the charge pump to the switch, such that the switch controls the flow of current through the capacitor.

11. A switched mode power supply as set forth in claim 10 wherein the integrated circuit controller comprises a voltage regulator and has a regulated output reference, and wherein the regulated reference output is coupled to the switch to control the flow of current through the capacitor and thereby control the voltage supplied to the integrated circuit controller.

12. A method for operating a charge pump power supply having an input and an output, the output coupled to a load, the load having a bulk capacitor coupled thereto for providing voltage source for the load, comprising;

providing a source of varying voltage as an input to the charge pump power supply, coupling the output of the charge pump power supply to the load and to the bulk capacitor, operating the charge pump power supply in a first mode to provide current for charging the bulk capacitor when the voltage at the load is below a predetermined voltage, and alternatively operating the charge pump power supply in a second mode to cease the supply of current to the bulk capacitor when the voltage at the power supply is above a predetermined voltage.

13. A method for providing the regulated power source as set forth in claim 12 wherein the charge pump power supply comprises an input capacitor coupled to the source of varying voltage, a first diode coupled to the capacitor and to a load to allow current to flow through the first diode, a second diode having its cathode connected to the junction between the first diode and the input capacitor, and a switch coupled to the charge pump power supply for selectively limiting the current through the input capacitor to regulate the voltage of the power supply to the load by regulating the supply of current to the bulk capacitor.

14. A method for providing the regulated power source as set forth in claim 13 wherein the switch is coupled across one of the first or second diodes to short the diode when the switch is closed thereby limiting the flow of current through the input capacitor.

15. A method for providing the regulated power source as set forth in claim 13 wherein the switch is coupled in series between the source of varying voltage and the input capacitor thereby limiting the flow of current through the input capacitor.

\* \* \* \* \*